UNITED STATES PATENT OFFICE.

PAUL KROPF, OF CHICAGO, ILLINOIS, ASSIGNOR TO THE INTERNATIONAL FERMENTING AND AGING COMPANY, OF SAME PLACE.

PROCESS OF MANUFACTURING BEER.

SPECIFICATION forming part of Letters Patent No. 619,317, dated February 14, 1899.

Application filed November 25, 1898. Serial No. 697,399. (No specimens.)

*To all whom it may concern:*

Be it known that I, PAUL KROPF, a citizen of the United States, residing at Chicago, county of Cook, State of Illinois, have invented certain new and useful Improvements in Processes of Manufacturing Beer, of which the following is a specification.

My invention relates to improvements in the process of manufacturing beer, such as is known commercially as "lager-beer," and has especial reference to the treatment of the wort during fermentation.

The object of my invention is to effect the complete operation of making such beer in from one-third to one-fourth of the time required by the usual processes, and at the same time to produce a beer which will be free from bacteria and possess all of the desirable qualities of the high-grade beers.

In the common process of manufacturing beer, which requires from forty-five to sixty days, the exact time depending on the quality of beer desired and whether it is for immediate use or for export the following steps are observed: After the cooked beer-wort is cooled down to about 44° Fahrenheit it is conveyed to the fermenting-vat, where the necessary yeast is added to produce the first fermentation, which occupies from eight to twelve days. When it has reached the desired or proper degree of fermentation, the beer is drawn off into the storage-casks for the second or after fermentation, which requires from thirty to forty days, when the beer is drawn into the chips-cask and kraeusened up, or it may be taken directly to the carbonator and charged with carbonic acid. The object of the first fermentation is to divide the fermentable sugars in the beer-wort into alcohol and carbonic acid. When such division is effected to the proper degree, as shown by the saccharimeter, the fermentation is interrupted by withdrawing the beer from the yeast and turning it into the storage-cask for ripening. During the ripening period, which, as above stated, requires from thirty to forty days, a second or after fermentation is effected, which separates the floating yeast from the beer and converts the resin of the hops by oxidation into solids, which fall to the bottom, and transforms the alcohol or a portion thereof into aromatic ethers and slowly eliminates the nitrogenous bodies or albuminous matters. The beer is then ready for filtering and to be run into the chips-cask or the carbonator. It is apparent that the length of time required to produce beer by the old and common processes increases the contamination by bacteria, and the harmful effect of the latter can only be avoided by pasteurizing methods. The common processes involve great expense for storage-room and cooling apparatus, which is another serious objection which I overcome in the following manner:

The cooked beer-wort is cooled down to 44° Fahrenheit, as in the old processes, and the first fermentation is produced in the usual manner. When this fermentation has reached the proper stage, as shown by the saccharimeter, which occupies from ten to twelve days, depending on whether low or high fermented beer is wanted, I pass through the wort ozonized air from four to six hours, the exact length of time of such treatment depending on the original specific gravity of the wort. It will be understood that the time required for this first fermentation varies according to the quality of the wort and the quality of the yeast used, and therefore the time for introducing the ozonized air must be determined in each particular case, it being understood that it should be applied during the latter part of such fermentation. After treating the wort by the ozonized air I cool the beer which is then formed until it is reduced to a temperature of 32° Fahrenheit to eliminate the albuminoids, when it is conveyed to the settling-tub, where it is kept at such temperature for about forty-eight hours, when it is ready for filtering and carbonating. Thus it will be seen that from the wort-kettle to the beer-keg the production of beer by my process does not require more than fourteen days as against forty-five to sixty days by the common processes. It will also be seen that by ozonizing the air which I introduce into the wort I destroy all germs and bacteria, and thus produce a much purer beer than is possible by the old processes involving long exposure to the common air, and not only does my process produce a purer beer, but the oxidizing qualities of the ozonized air are so effective that the yeast and the albuminoids are all eliminated during the one fermentation and the second or further fermentation is not required.

In the few hours during which I subject the wort to ozonized air I convert the resins of the hops and transform the alcohol into aromatic ethers as effectively as in the old process, which requires from thirty to forty days to effect the same result.

I have found by extensive experimentation that in order to secure the best results from my process I must ozonize the air by subjecting it to a strong electric current—say of about twenty-five thousand volts—and that this ozonized air must be introduced into the wort during the latter part of the first fermentation.

Having thus described my invention, what I claim as new, and desire to secure by Letters Patent, is—

1. In the manufacture of beer, fermenting the wort for a period of from eight to twelve days, and then introducing ozonized air into the wort during the latter part of such fermentation.

2. In the manufacture of beer, fermenting the wort for a period of from eight to twelve days, and then introducing ozonized air into the wort for from four to six hours during the latter part of such fermentation.

3. In the manufacture of beer, fermenting the wort for a period of from eight to twelve days, and then introducing electrically ozonized air into the wort during the latter part of such fermentation.

In testimony whereof I affix my signature in presence of two witnesses.

PAUL KROPF.

Witnesses:
  L. HANKE,
  J. BUEHLER.